US008015086B2

(12) United States Patent (10) Patent No.: US 8,015,086 B2
Greer et al. (45) Date of Patent: Sep. 6, 2011

(54) SYSTEM AND METHOD FOR CALCULATING EMPLOYEE EXPENSES

(75) Inventors: Mark Greer, Atlanta, GA (US);
Gregory Thomas, Cypress, TX (US);
James R. Bennett, Atlanta, GA (US);
Lyn Y. Chu, Marietta, GA (US);
Stephanie L. Sharples, Elbert, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1151 days.

(21) Appl. No.: 11/226,532

(22) Filed: Sep. 13, 2005

(65) Prior Publication Data
US 2006/0080126 A1 Apr. 13, 2006

Related U.S. Application Data

(60) Provisional application No. 60/612,475, filed on Sep. 22, 2004.

(51) Int. Cl.
*G06Q 40/00* (2006.01)
(52) U.S. Cl. .......................................... 705/35; 705/39
(58) Field of Classification Search .................... 705/35
See application file for complete search history.

(56) References Cited

U.S. PATENT DOCUMENTS

| 5,465,206 A * | 11/1995 | Hilt et al. ........................ 705/40 |
| 6,029,144 A * | 2/2000 | Barrett et al. ................... 705/30 |
| 6,510,156 B1 * | 1/2003 | Brock et al. ................. 370/395.1 |
| 7,240,283 B1 * | 7/2007 | Paila et al. ..................... 715/205 |
| 2002/0169701 A1 * | 11/2002 | Tarbox et al. ................... 705/36 |
| 2004/0249745 A1 * | 12/2004 | Baaren ............................ 705/39 |
| 2005/0014117 A1 * | 1/2005 | Stillman ....................... 434/322 |
| 2005/0279824 A1 * | 12/2005 | Anderson et al. ............. 235/380 |
| 2006/0294004 A1 * | 12/2006 | Burge ............................ 705/39 |
| 2007/0283036 A1 * | 12/2007 | Dey et al. ..................... 709/233 |

* cited by examiner

*Primary Examiner* — Thomas Dixon
*Assistant Examiner* — Benjamin S Fields

(57) ABSTRACT

A method and apparatus for calculating employee expenses is disclosed herein. One embodiment of the method may include transferring first data from a first computer to a second computer. The first data causes the second computer to display text, wherein a portion of the text is a first inquiry related to at least one expense item of the employee. Second data is transferred from the second computer to the first computer, wherein the second data is representative of a response to the first inquiry and wherein the second data is smaller than the first data. A second inquiry related to the at least one expense item based on the response to the first inquiry is then determined. Third data representative of the second inquiry is transmitted from the first computer to the second computer. A portion of the text is modified upon receipt of the third data by the second computer, wherein the modified portion of the text is related to the second inquiry.

20 Claims, 3 Drawing Sheets

SYSTEM AND METHOD FOR CALCULATING EMPLOYEE EXPENSES

This application claims the benefit of U.S. Provisional Application No. 60/612,475, filed Sep. 22, 2004, for SYSTEM AND METHOD FOR CALCULATING EMPLOYEE EXPENSES of Keith R. Kirkpatrick et al., which is hereby incorporated by reference for all that is disclosed therein.

BACKGROUND

Employee expense reimbursement programs calculate expenses incurred by an employee or on behalf of an employee during the course of employment. These expenses are typically related to travel expenses, such as airfare, hotel costs, rental car costs, and the like. Due to corporate rules and tax laws involving employee expenses, programs that calculate and track employee expenses need to be very sophisticated. In addition, due to changes in corporate rules and tax laws, the programs typically need to be updated or revised. These problems are exacerbated when employees incur expenses as a result of travel in several foreign countries.

Some employee expense reimbursement programs are run from a remote location, such as a server, wherein the employee accesses or executes the program from a workstation or the like. For example, the employee may use a personal computer to run the expense reimbursement program. The program and related data may be located on a server or the like, which may be connected to the employee workstation via a company network or via the Internet. Many of these programs operate using a web-based browser program and require reloading browser or web pages as data is input by the employee into the program. The web pages may also have to be reloaded as the program requests more data from the employee. This reloading of web pages causes the programs to operate very slowly when they are run over a network.

DETAILED DESCRIPTION

Figure 1:
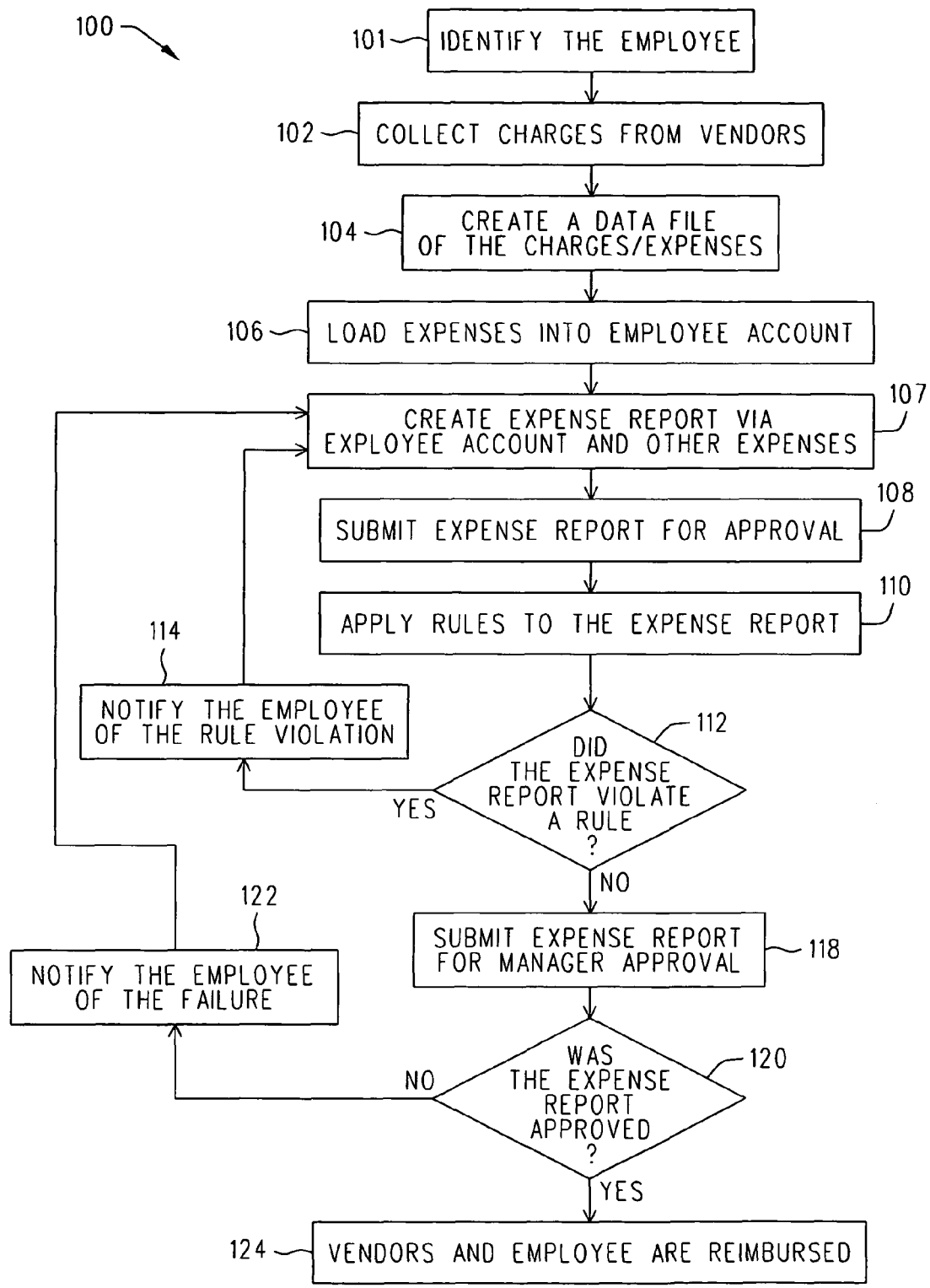
FIG. 1 is a flowchart describing an embodiment of a system and method for tracking and reimbursing employee expenses.

Methods and systems for calculating and tracking employee expenses and related reimbursements are described herein. The methods are sometimes simply referred to as calculating and tracking employee expenses. An example of a process for calculating and tracking employee expenses is shown in the flowchart 100 of FIG. 1. The flowchart 100 of FIG. 1 provides a simplified version of some embodiments of the process. More detailed descriptions of various processes are provided further below. The processes described by the flowchart 100 are typically performed after expenses are incurred, such as after an employee returns from a business trip. However, in some embodiments, all or some of the processes may be performed as expenses are incurred.

The process may be initiated by an employee entering identification information as shown in block 101. Entering of the employee identification may be in response to a inquiry made by the expense report program. For example, after the employee starts the program, the program may ask the employee for some sort of identification.

At block 102, charges incurred by the employee are collected from vendors. For example, the employee may have used a credit card or the like issued by the employer or a credit card company used by the employer. Block 102 may retrieve expenses that have been charged to the credit card. These expenses may include hotel, dining, and rental car charges. The program may contact the credit card company and download the charges. At block 104, the charges or expenses are placed into a database. The database may sort the expenses by date incurred or by the type of expense, such as hotels, restaurants, and rental cars. At block 106, the expenses are loaded into an employee account. It is noted that blocks 104 and 106 are exemplary and that other methods for loading employee expenses into an employee account may be used. In summary, the expenses incurred by an employee are placed in a database for further processing by the program.

In other embodiments, all expenses are periodically downloaded from the vendors, such as credit card companies. For example, the program may calculate the expenses incurred by a large company on a daily basis. The program may contact credit card companies of credit cards issued to the company, or the employee on behalf of the company, and download the charges incurred on the credit cards on a daily basis. The downloaded information may include the amount of the charges, the date and location the charges were incurred, and the employee who incurred the charges. The charges may be organized in a database that includes the employee who incurred the charges as set forth above.

In some situations, all the expenses are not downloadable. For example, the employee may have paid for items and services using cash and may have received paper receipts. Such expenses may include dry-cleaning and entertainment expenses. As described in greater detail below, these expenses may be entered manually by the employee. In addition, the receipts may be scanned and an image file representative of the receipts may be attached to the expense report.

At block 107, the expense report is created. Creation of the expense report is described in greater detail below. In summary, the above-described data is stored on a first computer or server. Data, typically representative of inquiries, necessary to create the expense report is transmitted to a second computer and displayed via a web page or the like. Small portions of the web page are renewed via the second computer as the data is collected. Because only small portions of the web page are renewed or otherwise reloaded, the time associated with generating the expense report is reduced. A more detailed description of the creation of the expense report is provided further below with reference to FIG. 3.

At block 108, the expense report is submitted for approval. For example, the employee may cause the expense report to be downloaded from the server or first computer to the computer of a person who approves expense reports. In another embodiment, the employee may cause data representative of the expense report that is stored on the first computer to be transferred to another location for review or marked in such a way that it is identified as being needed to be reviewed.

At block 110 electronic rules are applied to the expense report to determine whether any errors exist. This application of rules to the expense report may constitute the first part of the approval process of block 108. Several rules may be established by the employer. For example, maximum amounts that may be reimbursed for a meal may be set by an employer. In addition, a check may be performed to make sure that there are no duplicate transactions. The rules may also make sure that the expenses and reimbursements comply with applicable tax laws and other applicable laws.

At decision block 112, a determination is made as to whether any of the rules of block 110 were violated. If a rule was violated, processing proceeds to block 114 where the employee is informed of the violation. Processing then returns to block 106 where the employee may fix the expense report and resubmit it. It is noted that in another embodiment, the employee may be offered a chance to correct the errors rather than complete a new expense report.

If the determination from decision block 112 is negative, processing proceeds to block 118. More specifically, if the program found that no rules were violated, processing proceeds to block 118. At block 118, a manager or someone with authority to review expense reports reviews the expense report. In one embodiment, the manager is sent a message, such as an e-mail message, indicating that an expense report is ready for review. The e-mail message may provide a link to data representative of the expense report stored in the first computer so that the expense report is able to be displayed on the computer used by the manager.

Processing then proceeds to decision block 120 where a determination is made as to whether the manager approved the expense report. If the manager did not approve the expense report, processing proceeds to block 122 where the employee is notified of the decision of the manager. Processing then continues to block 106 where the employee may modify the expense report or create a new expense report. In one embodiment, the manager may add comments to the expense report indicating the reasons for the denial of approval.

If the determination of decision block 120 is affirmative, processing proceeds to block 124 where the vendors are paid and the employee is reimbursed for expenses. Several methods may be used to reimburse the employee, such as issuing a check or having the reimbursement applied to the salary of the employee. In another embodiment, the vendors may be paid as soon as their charges arrive. Therefore, in block 124, charges from vendors that should not have been paid from the employer may be charged to the employee. For example, personal expenses may be charged back to the employee or otherwise deducted from the reimbursement the employee would have otherwise received.

Having broadly described an embodiment of the method for tracking and reimbursing employee expenses, embodiment of both the system and method will now be described in greater detail. The following description focuses on embodiments of the computer systems and programs that may be used in conjunction with the flowchart 100 of FIG. 1.

Figure 2:
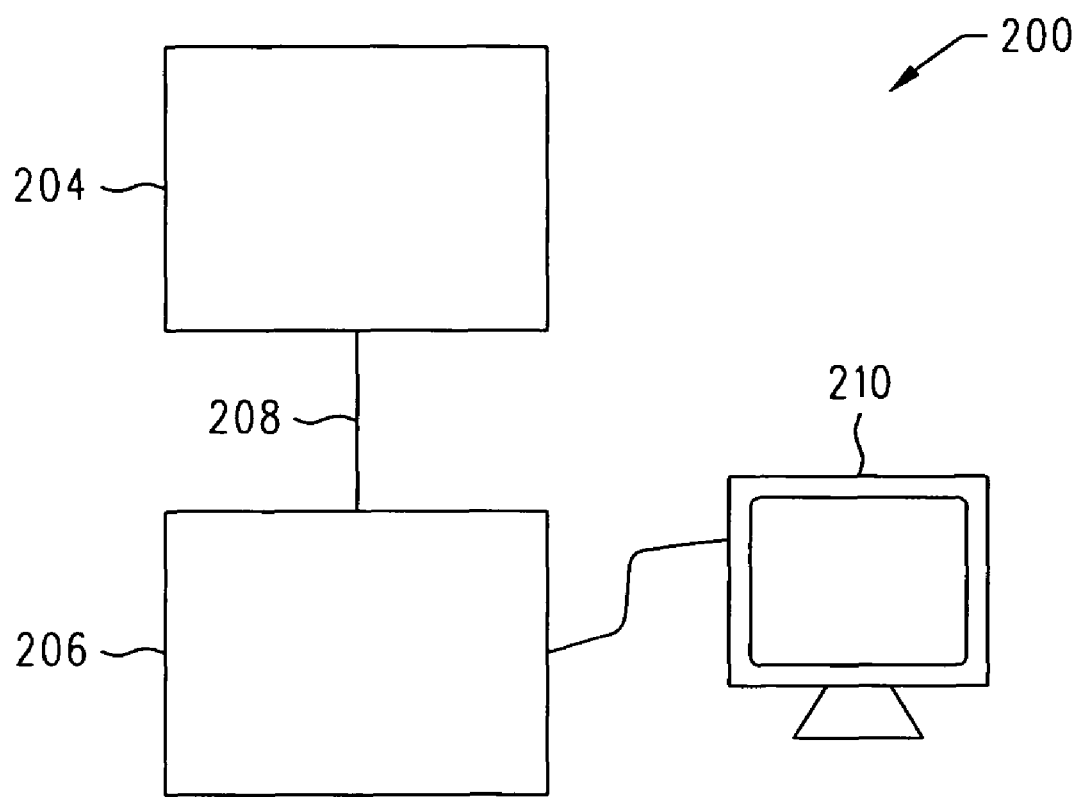
FIG. 2 is a schematic illustration of an embodiment of an computer system that may be used in conjunction with the flowchart of FIG. 1.

Referring to FIG. 2, a simple network or computer system 200 is shown. The system 200 of FIG. 2 includes a first computer 204, a second computer 206, and a network 208 connected therebetween. The second computer 206 has a display device or other monitor 110 connected thereto.

The first computer 204 may be associated with a server or the like and may be located remote from said second computer 206. The employee for whom expenses are being calculated or tracked uses the second computer 206, and is sometimes referred to as the user. As described in greater detail below, the first computer 204 may store programs that perform the employee expense reimbursement and tracking calculations described herein. As also described in greater detail below, the first computer 204 may store programs that control the operation of the second computer 206 during calculation and tracking of employee expenses. The first computer 204 may cause a web page or the like to load onto the second computer 206 and be displayed on the monitor 210. The web page serves as a user interface for requesting information from the employee and providing the employee with information regarding an expense report. As described in greater detail below, some or all of the employee expense calculations may be performed on the second computer 206. This may be achieved by having the first computer 204 load algorithms onto the second computer 206 wherein the second computer performs the algorithms. For example, currency rates used in currency conversion may be loaded from the first computer 204 to the second computer 206 wherein the conversions are performed on the second computer 206.

The second computer 206 may be a workstation or personal computer that controls the display 210. The display 210 displays a web page or other similar display during the calculation of employee expenses. More specifically, the display 210 displays information related to the expense reports. In summary, the operation of the second computer 206 is dictated by the first computer 204 in that the first computer 204 provides data for display by the second computer 206 and the attached display 210. As also described in greater detail below, the first computer 204 causes the second computer 206 to display or otherwise ask questions of the employee related to the expenses.

The network 208 may be any system or device that provides for communications between the first computer 204 and the second computer 206. The network 208 may include a plurality of network devices, such as routers and switches, that are not shown or described herein. In one embodiment, the network 208 is the Internet.

Having described the computer system 200, the systems and methods for tracking and calculating employee expenses and reimbursements will now be described with reference to the first computer 204 and the second computer 206. In summary, the first computer 204 causes the second computer 206 to ask a user or employee a plurality of questions related to expenses and possible reimbursements. The questions are displayed on the monitor 210 by way of a web page or other similar program running on the second computer 206.

The response to a first question may yield a specific second question that is based on the response to the first question. For example, a first question involving travel related expenses may ask to which country the employee traveled. The response to the first question would be the country traveled. The response (the country to which the employee traveled) may dictate a second question such as the amount of money spent on a certain activity, wherein the second question is based on the currency of the traveled country. Therefore, if the employee were asked to which country he traveled and the employee answered that he traveled to Italy, the next question asked may relate to the amount of money in euros spend on a specific activity.

With reference to the above-described example, either the first computer 204 or the second computer 206 may obtain the exchange rate for the specific country on the day the charges were incurred. Likewise, either the first computer 204 or the second computer 206 may perform the calculations to convert the currency from the country to which the employee traveled to the country of origin of the company or the employee. It is noted that either the first computer 204 or the second computer 206 may obtain other information stored on other computers that is required to complete an expense report.

During transfer of the questions and responses, a minimal amount of data is transmitted between the first computer 204 and the second computer 206, which reduces the amount of time required for an employee to complete the expense report. For example, rather than transmitting a whole web page, only data related to the question or response is transmitted. Thus, the whole web page does not need to be transmitted between the computers, which, as described above, decreases the time required to complete the employee expense procedure. Likewise, the whole web page does not have to be loaded onto the second computer 206.

Having summarily described the systems and methods for tracking and calculating employee expenses and reimbursements, they will now be described in greater detail.

Figure 3:
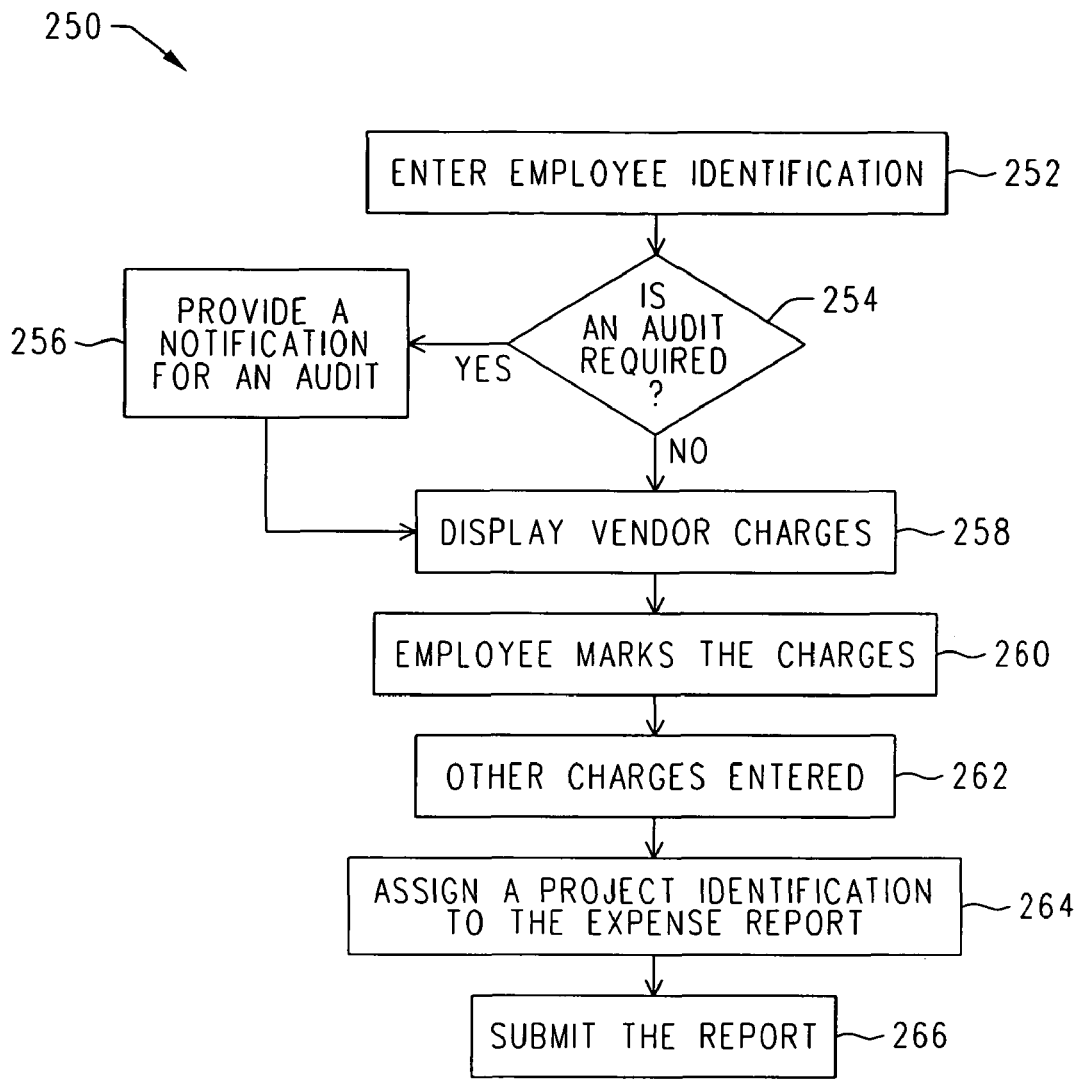
FIG. 3 is a flowchart that describes an embodiment of a process for tracking and calculating employee expenses.

An embodiment of the interaction between the first computer 204 and the second computer 206 is shown in the flowchart 250 of FIG. 3. With additional reference to FIG. 2, in block 252, the method may commence with the second computer 206 asking the user to input identification information. More specifically, the user may initiate the employee expense program on the second computer 206. The second computer 206 may then request that the first computer 204 commence running the program on the second computer 206. The first computer 204 may then cause the second computer 206 to display a web page or a plurality of web pages related to the employee expense program. As set forth above, part of the process, such as performing calculations and the like, may be performed on either computer.

As set forth above, many of the data transfers between the first computer 204 and the second computer 206 may be limited solely to data required for processing a specific request. Therefore, the second computer 206 may display a web page via a web browser that requests the user enter identification, such as an employee number. The second computer 206 may send just the employee number to the first computer 204, rather than the whole web page. Therefore, entire web pages do not need to be transmitted between the first computer 204 and the second computer 206. Likewise, the whole web page does not have to be reloaded onto the second computer 206 for display on the monitor 210.

When the identity of the user or employee has been established, the processing may proceed to decision block 254. Decision block 254 determines whether an audit of the expense report is required. For example, the first computer 204 may compare the identity of the employee to a database of users who require auditing of their expense reports. These employees may include those who hold specific types of credit cards, have been suspected of fraud, have abused a company credit card, or have knowledge of the expense reporting system. If the criteria are matched, the program may proceed to block 256 where a flag or the like is set to indicate that auditing is required. The employee may not be aware that such a flag is set.

In addition to the auditing, when the user or employee has been established, reimbursement and other rules that are applicable to the employee may be applied to the reimbursement process. For example, the country or region that the employee resides may be obtained via the employee identification. Based on the this information, the language used by the employee may be used. In addition, tax rules and other reimbursement rules to which the employee is subject may be applied during the reimbursement process. In one embodiment, the employee may be a member of a group that has specific rules applied to the members of that group.

Processing continues to block 258 where vendor charges are displayed on the monitor 210. As set forth above, the first computer 204 may obtain vendor charges from a database or credit card company. These charges may then be displayed on the monitor 210 via a web page or other display program as set forth above. At block 260, the employee marks the charges as being personal or related to business. The business charges will be included in the expense report. As described above, when information related to charges are transmitted between the computers, only small portions of the web page rather than the entire web page are transmitted between the computers. At block 262, the employee may enter other expenses, such as mileage and per diem expenses. Entry of an expense may cause a specific inquiry. For example, if the expenses are obtained in a foreign country, the first computer 204 may cause the second computer 206 to perform currency exchanges based on the currency of the country of the employee and the country visited.

As briefly described above, not all the expenses may be downloaded by either the first or second computer. For example, the employee may have paid some expenses using cash. The employee may electronically submit receipts for the cash expenses and other expenses. For example, the employee may optically scan the receipts and have the data representative of the receipts stored in either computer. The employee may then electronically attach the appropriate images of the receipts to the expense report.

At block 264, a project identification may be assigned to the expense report. The assignment may be done by the employee who is completing the expense report. In another embodiment, a manager or the like reviewing the expense report may assign a project identification. In one embodiment the expense report may be split among different projects. For example, if an employee incurred travel expenses for a first project and a second project, the employee may allocate a first percentage of the expense report to the first project and the remaining percentage to the second expense report.

At block 266, the report is submitted electronically, which corresponds to block 118 of the flowchart 100. As set forth above, rules may be applied to the expense report in order to determine whether the expenses are within preselected parameters. If an error is found in the expense report, it may be transmitted back to the employee for correction. In addition, if it was determined that the expense report needs to have an audit, the expense report may be electronically submitted to a person authorized to audit the expense report.

With regard to the program, various computer programs or computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor, an electromagnetic, optical, infrared transmission, etc. The storage medium may even comprise an electronic circuit, with the code or instructions represented by the design of the electronic circuit. Specific examples include magnetic or optical disks, both fixed and removable, semiconductor memory devices, such as memory cards and read-only memories (ROMs), including programmable and erasable ROMs, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also be tangibly embodied as an electrical signal in a transmission medium such as the Internet or other types of networks, both wired and wireless.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
    transferring first data from a first computer to a second computer, wherein the first data represents an employee expense entry user interface and is to cause the second computer to display the user interface at the second computer, wherein a first portion of the user interface comprises a first inquiry related to an expense item of an employee expense report;
    receiving second data from the second computer at the first computer, wherein the second data represents a response to the first inquiry;
    determining, at the first computer, a second inquiry related to the expense item based on the response to the first inquiry; and
    transmitting third data representative of the second inquiry from the first computer to the second computer, wherein the third data is to cause the second computer to modify a second portion of the same user interface at the second computer to present the response and the second inquiry, and wherein the third data comprises fewer bytes than the first data.

2. The method of claim 1, wherein the user interface comprises a web page.

3. The method of claim 1, further comprising transferring fourth data from the first computer to the second computer, wherein the fourth data represents an algorithm the second computer is to perform.

4. The method of claim 3, wherein the algorithm is to convert a first currency value to a second currency value.

5. The method of claim 1, further comprising:
    storing at least one employee expense on a third computer; and
    transferring fourth data representative of the at least one employee expense from the third computer to the first computer.

6. The method of claim 1, further comprising transferring at least one currency exchange rate for a day of interest from a fourth computer to the first computer.

7. The method of, further comprising analyzing the first data transmitted to the first computer for compliance with a rule.

8. The method of claim 7, wherein the rule comprises determining whether the expense report contains a duplicate entry.

9. The method of claim 1, wherein the first computer generates an expense report based at least in part on the first data received from the second computer.

10. The method of claim 9, further comprising transmitting fourth data representative of the expense report to a fifth computer.

11. The method of claim 9, further comprising transmitting a message to a fifth computer, wherein the message contains a link to fourth data representative of the expense report.

12. The method of claim 1, further comprising transferring fourth data comprising an identifier representative of a person providing the response to the first inquiry from the second computer to the first computer.

13. The method of claim 12, further comprising:
    comparing the identifier to a database of employee identifiers; and
    submitting the employee expense report for an audit when the identifier matches an employee identifier in the database.

14. A tangible article of manufacture storing machine-readable instructions that, when executed, cause a first computer to:
    transfer first data to a second computer, the first data representing an employee expense entry user interface and is to cause the second computer to display the user interface at the second computer, a first portion of the user interface comprising a first inquiry related to an expense item of an employee expense report;
    receive second data from the second computer, the second data representing a response to the first inquiry;
    determine a second inquiry related to the expense item based on the response to the first inquiry; and
    transmit third data representative of the second inquiry to the second computer, the third data is to cause the second computer to modify a second portion of the same user interface at the second computer to present the response and the second inquiry, and the third data including fewer bytes than the first data.

15. A tangible article of manufacture as defined in claim 14, wherein the user interface comprises a web page.

16. A tangible article of manufacture as defined in claim 14, wherein the machine-readable instructions, when executed, cause the first computer to transfer fourth data to the second computer, wherein the fourth data represents an algorithm the second computer is to perform.

17. A tangible article of manufacture as defined in claim 14, wherein the machine-readable instructions, when executed, cause the first computer to:
    store an employee expense on a third computer; and
    transfer fouth data representative of the employee expense from the third computer to the first computer.

18. A tangible article of manufacture as defined in claim 14, wherein the machine-readable instructions, when executed, cause the first computer to analyze the second data for compliance with a rule.

19. A tangible article of manufacture as defined in claim 14, wherein the machine-readable instructions, when executed, cause the first computer to transfer fourth data comprising an identifier representative of a person providing the response to the first inquiry from the second computer.

20. A tangible article of manufacture as defined in claim 19, wherein the machine-readable instructions, when executed, cause the first computer to:
    compare the identifier to a database of employee identifiers; and
    submit the employee expense report for an audit when the identifier matches one of the employee identifiers.

* * * * *

UNITED STATES PATENT AND TRADEMARK OFFICE
CERTIFICATE OF CORRECTION

PATENT NO.       : 8,015,086 B2                                    Page 1 of 1
APPLICATION NO.  : 11/226532
DATED            : September 6, 2011
INVENTOR(S)      : Mark Greer et al.

It is certified that error appears in the above-identified patent and that said Letters Patent is hereby corrected as shown below:

In column 7, line 50, in Claim 7, delete "of," and insert -- of claim 1, --, therefor.

In column 8, line 42, in Claim 17, delete "fouth" and insert -- fourth --, therefor.

Signed and Sealed this
Tenth Day of April, 2012

David J. Kappos
*Director of the United States Patent and Trademark Office*